United States Patent Office 3,022,277
Patented Feb. 20, 1962

3,022,277
POLYHALOGEN CONTAINING BICYCLIC
ACRYLATE ESTERS
Samuel J. Nelson, Bloomingdale, N.J., assignor to Hooker Chemical Corporation, Niagara Falls, N.Y., a corporation of New York
No Drawing. Filed July 17, 1958, Ser. No. 749,069
12 Claims. (Cl. 260—86.7)

This invention relates to new compositions of matter. More specifically, this invention relates to polyhalogen containing bicyclic acrylate esters having the following structural formula:

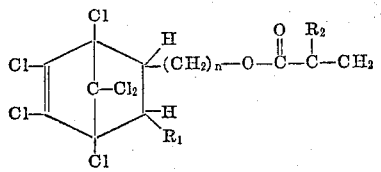

wherein $n$ is an integer from 0 to 9, $R_1$ is an hydrogen radical, or a methyl radical, $R_2$ is an hydrogen radical, an halogen radical, or an alkyl radical containing from 1 to 4 carbon atoms.

The compounds which are the subject of the present invention are monomers which may be either homopolymerized or copolymerized either in bulk or in suspension. The resulting homopolymers which are obtained are thermoplastic materials which may be molded by conventional techniques. By careful control of conditions bulk polymerization of the monomers give hard, clear materials either in tubes or sheets. Due to the high percentage of chlorine present in the materials, the polymers are self-extinguishing when ignited. Copolymers may be prepared from these monomers and compounds containing a polymerizable $CH_2=C<$ group. The resulting polymers are thermoplastic, moldable materials with a wide variety of uses. The chlorine content of these polymers is sufficiently high to render these materials self-extinguishing when ignited. The compounds of the present invention, therefore, find wide utility in the preparation of copolymers with the above compounds to increase the fire resistance either as molded articles, sheets or foams.

The compositions of the present invention may be prepared in accordance with the following equation:

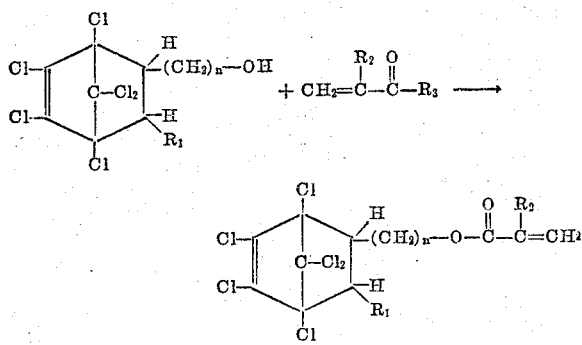

wherein $n$ is an integer from 0 to 9, $R_1$ is a hydrogen radical or a methyl radical, $R_2$ is a hydrogen radical, an halogen radical or an alkyl radical containing from 1 to 4 carbon atoms, and $R_3$ is a methoxy radical, an ethoxy radical or a chlorine radical.

The alcohols utilized in the present invention may be prepared by any convenient method known in the art; for example, the allyl alcohol adduct of hexachlorocyclopentadiene, 2-hydroxymethyl-1,4,5,6,7,7-hexachlorobicycloheptene-5, may be prepared by slowly adding allyl alcohol to a refluxing solution of hexachlorocyclopentadiene in a dichlorobenzene solvent, and subsequently maintaining the reaction mixture at an elevated temperature for at least five hours. Alternatively, the alcohols utilized in the present invention may be prepared by reacting, for example, hexachlorocyclopentadiene with vinyl acetate at an elevated temperature and subsequently converting to the free alcohol by hydrolysis. Illustrative of this latter method is German Patent 1,006,418, to Farbwerke Hoechst Aktiengesellschaft, September 19, 1957.

Illustrative, but not limitative, of typical alcohols utilized in the present invention, are the following:

2-hydroxy-1,4,5,6,7,7-hexachlorobicycloheptene-5;
2-hydroxymethyl-1,4,5,6,7,7-hexachlorobicycloheptene-5;
2 - (2 - hydroxyethyl) - 1,4,5,6,7,7 - hexachlorobicycloheptene-5;
2-(3-hydroxypropyl) - 1,4,5,6,7,7 - hexachlorobicycloheptene-5;
2-(3 - hydroxybutyl) - 1,4,5,6,7,7 - hexachlorobicycloheptene-5;
2-hydroxy-3 - methyl - 1,4,5,6,7,7 - hexachlorobicycloheptene-5;
2-hydroxymethyl-3 - methyl - 1,4,5,6,7,7 - hexachlorobicycloheptene-5; etc.

Typical acrylates utilized in the present invention include the following:

Methyl acrylate;
Methyl methacrylate;
Methyl-α-chloroacrylate;
Acrylyl chloride;
Methacrylyl chloride;
α-chloroacrylyl chloride; etc.

Stoichiometric amounts of the reactants may be used, or preferably a slight excess of acrylate, and it is advantageous to use a reaction diluent, such as benzene, the boiling point of which serves to control the reaction temperature. The reactants with the diluent may be added to a reactor and the reactants reacted by refluxing the reaction mixture from one to twenty-four hours, preferably from six to eighteen hours. To recover the product, the reaction mass is distilled at a reduced pressure to remove the diluent, and may then be distilled at a still lower pressure to obtain the product.

Alternatively, when the acrylate esters are employed, stoichiometric amounts of the reactants may be used in the presence of an acid catalyst, such as sulfuric acid; also it is advantageous to use a reaction diluent, such as benzene, which serves to control the reaction temperature and to azeotrope the by-product, alcohol. After the azeotrope can no longer be obtained, generally from one to twenty-four hours, the residue is neutralized by washing. The solvents are then recovered and the product distilled.

In order that those skilled in the art may have sufficiently detailed instructions in preparing the compounds of the present invention, the following examples will illustrate typical procedures. This detailed disclosure is not to be construed as limiting the scope of the present invention as further indicated elsewhere herein.

*Example 1.—Preparation of 2-methacryloxymethyl-
1,4,5,6,7,7-hexachlorobicycloheptene-5*

Ninety grams of 2-hydroxymethyl-1,4,5,6,7,7-hexachlorobicycloheptene-5 were placed in a five hundred milliliter, round-bottomed, one-necked flask. Thirty-eight and eight-tenths grams of methyl methacrylate, two milliliters of concentrated sulfuric acid and two hundred milliliters of benzene were added to the flask and the mixture refluxed under an eighteen inch by twelve millimeter fractionating column. An azeotrope of methyl alcohol and benzene was obtained and refluxing was continued until an azeotrope could no longer be obtained. The pot residue was taken up in ether, and extracted with five percent sodium hydroxide, the solvents were removed on a steam bath, one-tenth of a gram of picric acid added, and the oily residue distilled under vacuum through a short column. Seventy-one and five-tenths grams of product was obtained. This product boiled at one hundred and thirty-one to one hundred and thirty-three degrees centigrade at 0.08 millimeter pressure and had a chlorine content of 53.7 percent compared to the calculated chlorine content of 53.3 percent.

*Example 2.—Preparation of 2-acryloxymethyl-
1,4,5,6,7,7-hexachlorobicycloheptene-5*

Into a one hundred milliliter, round-bottomed, one-necked flask was added thirty-three and five-tenths grams of 2-hydroxymethyl-1,4,5,6,7,7-hexachlorobicycloheptene-5, ten grams of acrylyl chloride, and forty milliliters of benzene. The mixture was refluxed until hydrogen chloride evolution ceased. The benzene was removed by means of a water aspirator vacuum and the residue distilled under high vacuum. Thirty-two and five-tenths grams of product were obtained. This product boiled at about one hundred and twenty degrees centigrade at 0.15 millimeters pressure and had a chlorine content of 55.2 percent compared to the calculated chlorine content of 55.3 percent.

*Example 3.—Preparation of 2-acryloxy-
1,4,5,6,7,7-hexachlorobicycloheptene-5*

The above compound was prepared in a manner after Example 2, employing one hundred and twenty-six grams of 2-hydroxy-1,4,5,6,7,7-hexachlorobicycloheptene-5, thirty-seven point five grams of acrylyl chloride and one hundred and fifty milliliters of benzene. One hundred and twenty-three point six grams of product were obtained. This product boiled at about ninety-nine degrees centigrade at 0.12 millimeters pressure and had a chlorine content of fifty-eight percent compared to the calculated chlorine content of 57.5 percent. The compound had a refractive index of $n_D^{28}$ 1.5435 and a density of $d_4^{25}$ 1.5687.

*Example 4.—Preparation of 2-methacryloxy-
1,4,5,6,7,7-hexachlorobicycloheptene-5*

The above compound was prepared in a manner after Example 2, employing one hundred and twenty-six grams of 2-hydroxy-1,4,5,6,7,7-hexachlorobicycloheptene-5, forty point five grams of methacrylyl chloride, and one hundred and fifty milliliters of benzene. One hundred and fifteen point two grams of product were obtained. This product boiled at about one hundred and nine degrees centigrade at 0.15 millimeters pressure and had a chlorine content of 54.9 percent compared to the calculated chlorine content of 55.3 percent. The compound had a refractive index of $n_D^{28}$ 1.5421 and a density of $d_4^{25}$ 1.5352.

*Example 5.—Preparation of 2-methacryloxymethyl-3-
methyl-1,4,5,6,7,7-hexachlorobicycloheptene-5*

The above compound was prepared in a manner after Example 2 employing thirty-four point five grams of 2-hydroxymethyl-3-methyl-1,4,5,6,7,7-hexachlorobicycloheptene-5. Eleven point five grams of methacrylyl chloride and fifty milliliters of benzene. Thirty-one point five grams of product were obtained. The ester compound is a viscous liquid having a molecular weight of four hundred and thirteen.

*Example 6.—Preparation of 2-acryloxymethyl-3-methyl-
1,4,5,6,7,7-hexachlorobicycloheptene-5*

The above compound was prepared in a manner after Example 2, employing thirty-four point five grams of 2-hydroxymethyl-3-methyl-1,4,5,6,7,7-hexachlorobicycloheptene-5, nine point nine grams of acrylyl chloride and fifty milliliters of benzene. Twenty-nine point seven grams of product were obtained. The ester compound is a viscous liquid having a molecular weight of three hundred and ninety-nine.

*Example 7.—Preparation of 2-(9-methacryloxynonyl)-
1,4,5,6,7,7-hexachlorobicycloheptene-5*

The above compound was prepared in a manner after Example 2, employing forty-two point seven grams of 2-(9-hydroxynonyl)-1,4,5,6,7,7-hexachlorobicycloheptene-5, eleven point five grams of methacrylyl chloride, and sixty milliliters of benzene. Thirty-seven point three grams of product were obtained. The ester compound is a viscous liquid having a molecular weight of four hundred and ninety-four.

The following examples represent preparation of copolymers of (1) the products of the present invention and (2) a compound containing a polymerizable $CH_2=C<$ group.

*Example 8*

The monomer obtained in Example 1 was copolymerized with an equal weight of styrene. The product obtained was a hard, thermoplastic, clear resin possessing other desirable characteristics. The product contained twenty-six point six percent of chlorine combined by weight and was self-extinguishing when ignited.

*Example 9*

The monomer obtained in Example 4 was copolymerized with an equal weight of styrene. The product obtained was a hard, thermoplastic, clear resin, possessing other desirable characteristics. The product contained twenty-seven point six percent chlorine combined by weight and was self-extinguishing when ignited.

The following example represents the preparation of a homopolymer of the products of the present invention.

*Example 10*

To two point zero grams of the monomer obtained in Example 1 was added two point five percent of benzoyl peroxide as a fifty percent paste in tricresyl phosphate. In six and one-half hours it had polymerized to a hard, clear, thermoplastic resin. The product thus obtained was self-extinguishing when ignited.

The proportion of monomer to copolymerizable compound may be varied within a wide range, but generally molar ratios of the monomer to copolymerizable compound of from 1:1 to 1:7 are preferred. The temperature of reaction is not critical, and may be varied depending upon the initiator employed, such as benzoyl peroxide, methyl ethyl ketone peroxide, actinic light, etc. Alternatively, the reaction may be initiated by heat alone. Generally, temperatures of from zero to one hundred degrees centigrade are preferred. Any compound containing a polymerizable $CH_2=C<$ group may be employed; for example, styrene, divinyl compounds, diallyl compounds, etc.

This invention may be embodied in other forms or carried out in other ways without departing from the spirit or essential characteristics thereof. The present embodiment is therefore to be considered as in all respects, illustrative, and not restrictive, the scope of the invention being indicated by the appended claims, and all changes which come within the meaning and range of equivalency of the claims are intended to be embraced therein.

I claim:
1. A composition of matter having the formula:

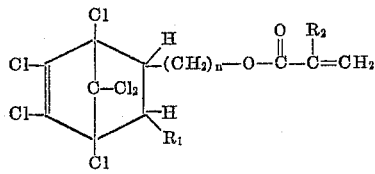

wherein $n$ is an integer from 0 to 9, $R_1$ is selected from the group consisting of an hydrogen radical and a methyl radical, and $R_2$ is selected from the group consisting of an hydrogen radical, an halogen radical, and an alkyl radical containing from 1 to 4 carbon atoms.

2. 2-methacryloxymethyl-1,4,5,6,7,7-hexachlorobicycloheptene-5.
3. 2 - acryloxymethyl - 1,4,5,6,7,7 - hexachlorobicycloheptene-5.
4. 2-methacryloxy - 1,4,5,6,7,7 - hexachlorobicycloheptene-5.
5. 2-acryloxy-1,4,5,6,7,7-hexachlorobicycloheptene-5.
6. The process which comprises heating together (I) a compound having the formula:

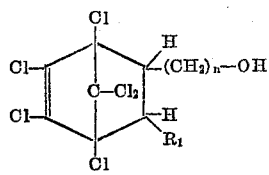

wherein $n$ is an integer from 0 to 9, and $R_1$ is selected from the group consisting of an hydrogen radical and a methyl radical; and (II) a compound having the formula:

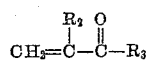

wherein $R_2$ is selected from the group consisting of an hydrogen radical, an halogen radical and an alkyl radical containing from 1 to 4 carbon atoms, and $R_3$ is selected from the group consisting of an methoxy radical, an ethoxy radical and a chlorine radical.

7. A composition according to claim 1 when polymerized to a self-extinguishing, hard, thermoplastic resin.
8. A composition according to claim 2 when polymerized to a self-extinguishing, hard, thermoplastic resin.
9. A polymerizable mixture comprising (I) a compound having the formula:

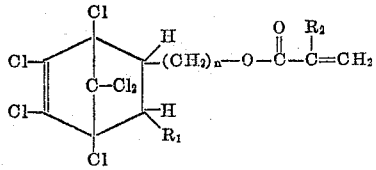

wherein $n$ is an integer from 0 to 9, $R_1$ is selected from the group consisting of an hydrogen radical and a methyl radical, $R_2$ is selected from the group consisting of an hydrogen radical, an halogen radical, and an alkyl radical containing from 1 to 4 carbon atoms, and (II) a compound containing a polymerizable $CH_2=C<$ group selected from the group consisting of styrene, a divinyl compound, and a diallyl compound.

10. A polymerizable mixture comprising (I) 2-methacryloxymethyl - 1,4,5,6,7,7 - hexachlorobicycloheptene-5, and (II) a compound containing a polymerizable $CH_2=C<$ group selected from the group consisting of styrene, a divinyl compound, and a diallyl compound.

11. A polymerizable mixture comprising (I) 2-methacryloxy-1,4,5,6,7,7-hexachlorobicycloheptene-5, and (II) a compound containing a polymerizable $CH_2=C<$ group selected from the group consisting of styrene, a divinyl compound, and a diallyl compound.

12. A self-extinguishing, hard, thermoplastic resin obtained by copolymerizing a composition according to claim 9.

References Cited in the file of this patent
UNITED STATES PATENTS

| | | |
|---|---|---|
| 2,129,666 | Barrett et al. | Sept. 13, 1938 |
| 2,838,479 | Biletch | June 10, 1958 |
| 2,841,485 | Johnson et al. | July 1, 1958 |
| 2,867,564 | Richter | Jan. 6, 1959 |

FOREIGN PATENTS

| 1,066,743 | Germany | Oct. 8, 1959 |
|---|---|---|

OTHER REFERENCES

McBee et al.: "Chemistry of Hexachlorocyclopentadiene," 77 JACS 4427–28 (1955).